Figure 1:
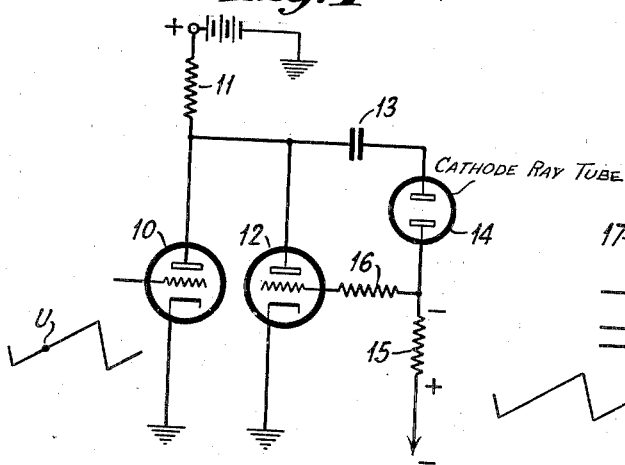

April 8, 1941.                M. GEIGER ET AL                 2,237,425
                         SAW-TOOTH WAVE GENERATOR
                           Filed June 15, 1938              2 Sheets-Sheet 1

INVENTORS
MAX GEIGER AND
RUDOLF URTEL
BY
*H. S. Snover*
ATTORNEY.

April 8, 1941.  M. GEIGER ET AL  2,237,425
SAW-TOOTH WAVE GENERATOR
Filed June 15, 1938   2 Sheets-Sheet 2

INVENTORS
MAX GEIGER AND
RUDOLF URTEL

BY   N. S. Brower
ATTORNEY.

UNITED STATES PATENT OFFICE 2,237,425

SAW-TOOTH WAVE GENERATOR

Max Geiger and Rudolf Urtel, Berlin, Germany, assignors to Telefunken Gesellschaft für Drahtlose Telegraphie m. b. H., Berlin, Germany, a corporation of Germany Application June 15, 1938, Serial No. 213,879
In Germany June 15, 1937

2 Claims. (Cl. 250—36)

This invention relates in general to saw-tooth wave oscillators, and more particularly to such arrangements wherein a saw-tooth wave form is produced by electromagnetic storage of energy.

By insuring a linear rise of the current in the choke-coil, with a source of voltage supply being applied to the choke-coil which, after termination of the rise of current is disconnected again, it has already been suggested in the prior art to vary the voltage impressed upon the coil as a function of the coil current in such a way that, if the coil current evidences an unduly rapid rise, the voltage across the coil is made to decrease, while it is made to rise in the presence of an unduly slow rise of the current as shown, for instance, in Geiger application Serial Number 212,723, filed June 9, 1938. Another suggestion which has been made for the purpose of generating a saw-tooth shaped voltage wave in which, as known in the art, a condenser is charged across a resistance from a source of D. C. voltage supply and is periodically discharged inside a brief length of time through a discharge tube connected in parallel relation to the condenser, a saw-tooth voltage wave is connected in series with the D. C. source of voltage supply which insures constancy and stability of the condenser charge current.

For the generation of saw-tooth voltage waves, of the kind adapted particularly for the deflection of the cathode-ray beam in television work, according to this invention, a regulator action acts as a function of a decrease of the time differential quotient of a voltage rise during the long upstroke of the saw-tooth which will tend and is designed to raise the said differential quotient and vice versa.

As shall be shown in the following exemplified embodiments of this invention, the quantity to be used for the regulator action may, for instance, be obtained by creating a saw-tooth shaped potential across a condenser and by utilizing the fall of potential which the charge current of the condenser or the charge current of the deflector plates of the cathode ray tube itself sets up across a resistance. But it is also feasible, for example, to cause a current corresponding to the potential at the condenser or the deflector plates of the cathode ray tube itself to traverse the primary winding of a transformer and to utilize the ensuing potential across the secondary winding for said regulation purposes.

Our invention will best be understood by reference to the figures of the drawings, in which Figs. 1 through 8 show embodiments thereof.

The exemplified embodiment shown in Fig. 1 comprises a tube 10 whose plate circuit contains a resistance 11, with another tube 12 being connected in parallel relation thereto. Connected with the plates of tubes 10 and 12 through a coupling condenser 13 are the deflector plates of the cathode ray tube 14. A resistance 15 is arranged in series with the deflector plates and connected at the same time in the control grid circuit of the tube 12 which moreover includes a resistance 16.

The arrangement shown in Fig. 1 operates as follows: A saw-tooth potential wave U is impressed upon the control grid of tube 10. This voltage may be produced in any desired manner at all. It need not be exactly rectilinear in form. The plate potential of tube 10 varies therefore in phase opposition to the potential U, in other words, it declines during the long saw-tooth stroke. To this potential decline corresponds a constant charge current which flows through the resistance 15 and which occasions a fall of potential across the resistance in the sense of the plus and minus signs indicated in the drawings. Now, if this drop of potential, because of a departure from strict linearity in shape of the long upstroke of the saw-tooth is subject to a change, this results in a growth or a decrease, as the case may be, of transmission of tube 12, with the result that a change of potential is occasioned at the plate of tubes 10 and 12 which produces an effect tending to linearize the saw-tooth stroke or slope. Resistance 16 serves the purpose to limit the high potential arising during the short saw-tooth stroke across the resistance 15 by the grid current of tube 12.

Figure 2:
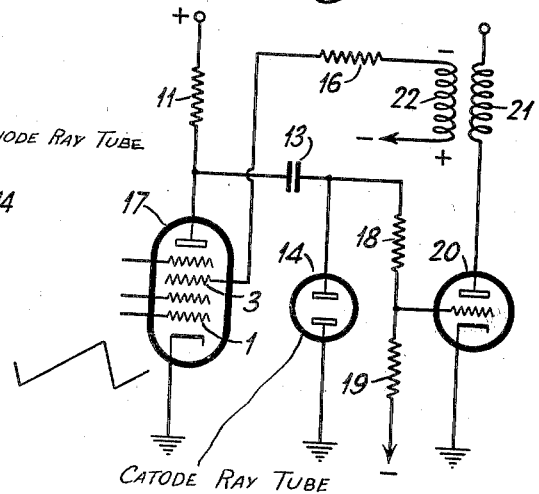

The exemplified embodiment, Fig. 2, shows a hexode type of tube at 17 whose grid 1 likewise has impressed thereon a saw-tooth voltage U. Resistance 11, coupling condenser 13 and the cathode ray tube 14 are connected in a way similar to the organization Fig. 1. In parallel relation to the deflector plates of the cathode ray tube is a voltage divider comprising the resistances 18 and 19. Connected with the said voltage divider is a tube 20 whose plate circuit contains the primary winding 21 of a transformer. The secondary winding 22 of this transformer is included in the circuit of grid 3 of tube 17 which comprises also a resistance 16.

The arrangement, Fig. 2, operates as follows: With a strictly straight voltage at the deflector plates of the cathode ray tube, the current flowing through the winding 21 varies linearly. To this current corresponds a constant potential across the secondary winding 22 in the sense of the plus and minus signs there indicated. Now, as soon as the slope or steepness of the long upstroke of the saw-tooth undergoes a change, there occurs also a change in the potential which arises across the secondary winding 22, and the grid 3 of the tube 17 experiences a control action such that the change in the slope is counteracted or compensated. Resistance 16 serves the same purpose as in the arrangement of Fig. 1.

Figure 3:
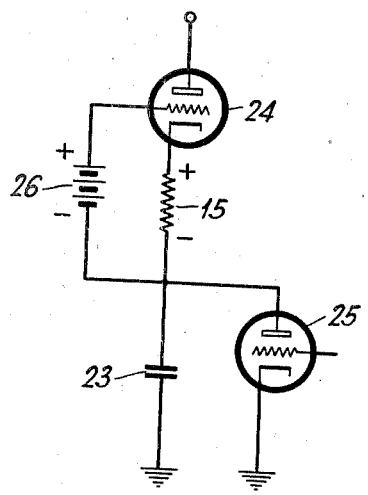

The embodiment shown in Fig. 3 contains a condenser 23 which is charged through a tube 24 serving as a charge resistance. In parallel relation to the condenser is a tube 25. The control grid of the tube 24 (optionally is biased positively through a D. C. source of potential 26 of a polarity as shown) is connected to the end of the resistance 15 turned away from and opposite the cathode of tube 24.

The arrangement as shown in Fig. 3 operates in the manner that condenser 23 through the tube 24 as well as the resistance 15 becomes charged up according to an e function, while being discharged again upon the arrival of a saw-tooth impulse at the control grid of tube 25 through the filament-plate path of this tube. During the long upstroke period of the saw-tooth, a fall of potential of a sign as indicated arises across the resistance 15 rendering the cathode of tube 24 more positive, and upon a reduction of the slope of the long upstroke of the saw-tooth, as a consequence, the fall of potential across the resistance 15 decreases, with the result that the control grid potential of tube 24 is shifted in the positive sense. This entails a reduction in the inner resistance of the tube 24 so that the saw-tooth begins again to rise more steeply. However, if the saw-tooth exhibits a tendency to rise too steeply, the fall of voltage across the resistance 15 increases, with the result that the control grid of tube 24 will be acted upon in a more negative sense. This means a rise of the inner resistance of the tube 24, and the charge current as well as the steepness of the saw-tooth diminish again. In this embodiment of the invention no particular steps and means have been provided or are required so as to block the regulator means during the short downstroke of the saw-tooth since the discharge of condenser 23 takes place through tube 25 and since the resistance 15 is traversed only by the charge current, but not by the discharge current, of the condenser 23.

Figure 4:
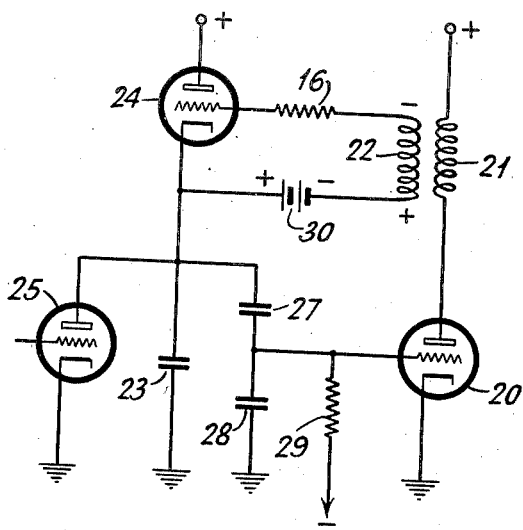

In the embodiment illustrated in Fig. 4, the condenser 23 is also charged across the tube 24, the latter serving as a charge resistance, while being discharged through the tube 25 subject to control action produced by the incoming synchronizing impulse. In parallel relation to the condenser 23 is a capacitive voltage divider comprising the condensers 27 and 28. To the last of these two condensers is connected the control grid circuit of a tube 20 the grid leak of which is indicated at 29. The circuit organization of the plate circuit of tube 20 is the same as in Fig. 2. The secondary winding 22 is included in the control-grid circuit of the charge tube 24 which includes a negative voltage supply source 30 as well as a grid leak 16.

The circuit organization shown in Fig. 4 operates in this manner that, as long as the tube 25 is blocked, the condenser 23 is discharged through the tube 24. Incidentally, the current flowing through the primary winding 21 rises in accordance with a linear law so that in the control grid circuit of tube 24 there acts a constant potential having a negative polarity. As soon as the voltage rise at the condenser 23 varies its steepness or rate there changes also the steepness or the rate of rise of the current in winding 21 and thereby the voltage across the secondary winding 22. This means that the variation of the steepness of the long saw-tooth stroke (upstroke) is compensated again. In order to cause return of the saw-tooth potential, tube 25 is unblocked (opened up) by means of an impulse supplied from the outside and thus the condenser 23 is discharged again. Resistance 16 serves, similarly as in the circuit organization Fig. 2, for the object of preventing undue opening of the tube 24 during the return stroke of the saw-tooth potential.

Figure 5:
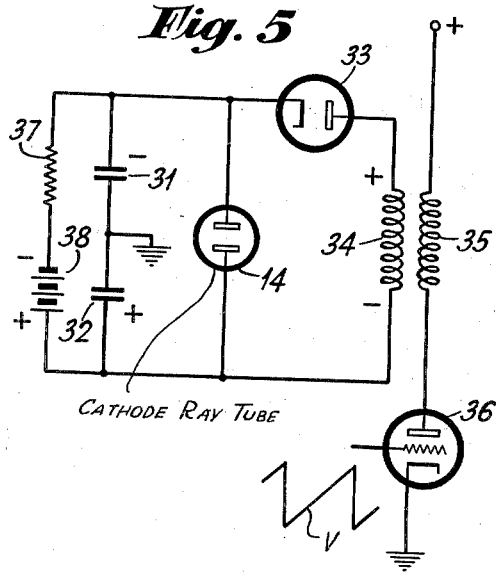
Figure 6:
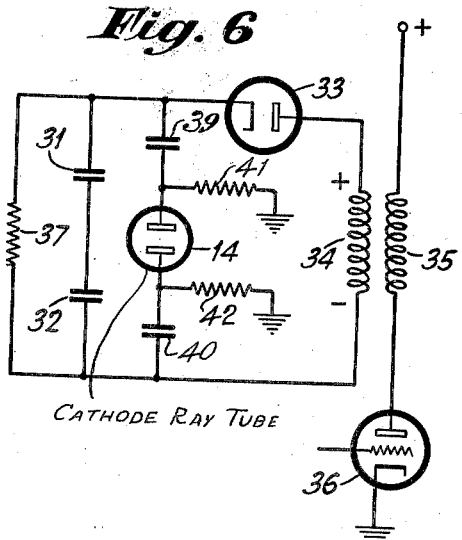

It is also possible in the sense of this invention to produce a so-called symmetric saw-tooth voltage, in other words, to create at the two deflector plates of the cathode-ray tube variations of potential which will be in opposition (phase opposition). This shall be explained in what follows by reference to the saw-tooth or ratchet organization illustrated in Fig. 5, though fundamentally this does not form an object of the invention. It will be seen that in parallel relation to the deflector plates of the cathode ray tube 14 are two condensers 31 and 32 the middle of which is connected with a fixed potential. The series connection of these condensers is united by way of a rectifier 33 with the secondary winding 34 of a transformer the primary winding 35 of which is included in the plate circuit of a controlled tube 36. The condensers 31 and 32 moreover are bridged by a resistance 37 which is connected in series with a D. C. source of potential 38. Now, the assumption shall first be made that there prevails at the condensers 31 and 32 a charge supplied by the source 38. At the control grid of tube 36 acts a voltage having a shape as indicated by curve V, which brings about a very rapid reduction in the plate current of this tube and thus also the current in the coil 35 periodically. During each rising branch or upstroke of curve V a potential is set up at the winding 34 whereby the end of the winding jointed to the anode of tube 33 is positive. This potential rapidly charges the condensers 31, 32, through the rectifier 33 in such a way that the sign of charge at these condensers becomes the opposite of what is indicated in Fig. 5. This change of potential at the condensers represents the return of the saw-tooth. Because of the unilateral conductivity of the rectifier 33, and because of the disappearance of the said voltage across the winding 34 the condensers are unable to become discharged through this winding. During the long stroke of the saw-tooth the condensers are charged through the resistance 37 with current of a sign opposite that through the rectifier 33. The condenser potential first passes through zero and then rises again in the presence of reversed direction of the charge current until another decrease in plate current is initiated in the tube 36. If the condenser voltage, which the charge current flowing through the rectifier 33 sets up, is of the same size, but of opposite sign compared with the condenser voltage which is created by the charge current flowing through the resistance 37, then a symmetric saw-tooth potential prevails at the deflector plates of the cathode-ray tube which will be free from a D. C. voltage component.

In a circuit organization of this nature, it is also possible to dispense with the source of D. C. voltage 38 as shown in the circuit scheme Fig. 6, while the D. C. voltage components arising at the condensers 31 and 32 are kept away from the deflector plates of the cathode-ray tube by means of two condensers 39, 40 and two resistances 41, 42.

Figure 7:
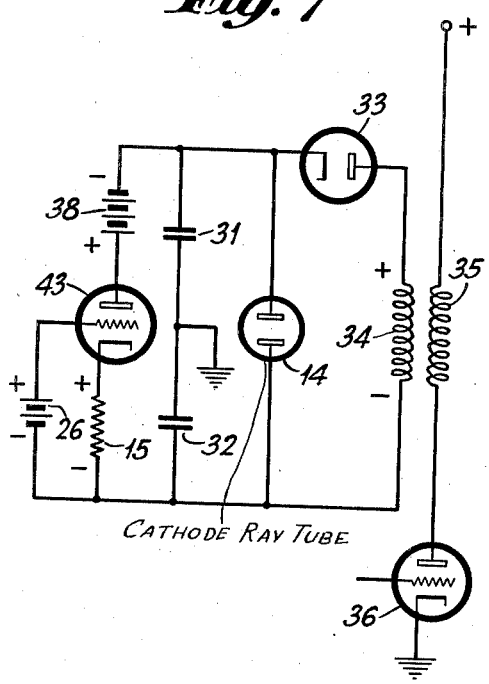

Fig. 7 shows the invention as embodied in a circuit organization comprising the use of a fall of potential created by the charge current of the condensers 31, 32, during the long upstroke voltage wave as applied to a symmetric saw-tooth generator of the kind shown in Fig. 5. The charging of the condensers 31 and 32 through the rectifier 33 for the production of the return of the saw-tooth proceeds in the very same manner as described by reference to Fig. 5. During the charge of the condensers through the controlled tube 43 which takes the place of the resistance 37, Fig. 5, the charge current creates across the resistance 15 a fall of potential whereby the cathode of tube 43 is rendered more positive which stabilizes the steepness of the long upstroke of the saw-tooth in the very same manner as explained, for instance, by reference to Fig. 3.

Figure 8:
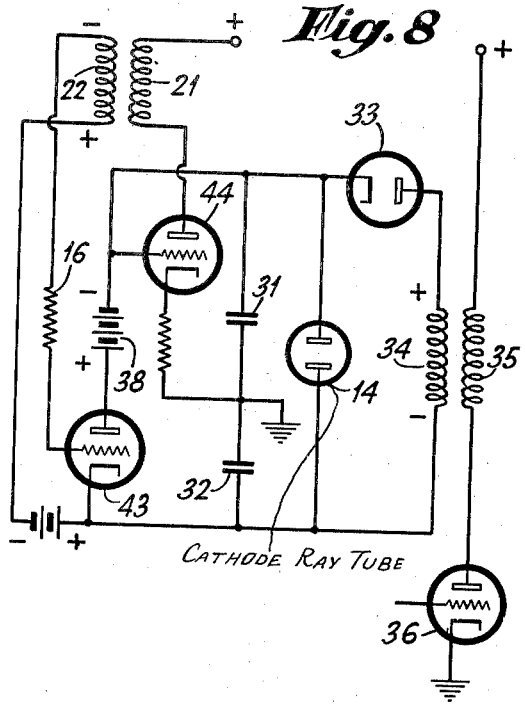

The exemplified embodiment shown in Fig. 8 illustrates the regulation of the saw-tooth slope for a symmetric saw-tooth generator as shown in Fig. 5 comprising the means and ways for producing the regulator potential as explained by reference to Figs. 2 and 4. Connected with the condenser 31 is the grid circuit of a controlled tube 44 which corresponds to the tube 20 in Figs. 2 and 4, and the plate circuit contains the primary winding of a transformer 21 the secondary winding 22 of which acts upon the tube 43 in the very same way as explained by reference to Fig. 4 for the tube 24. The resistance 16 serves again for the object of limiting the charge current which flows by way of the tube 43 during the return stroke of the saw-tooth potential.

Instead of practically rendering the regulator means inoperative during the saw-tooth return as described by reference to Figs. 1, 2, 4 and 8 by connecting a resistance in the grid circuit of the tube insuring the regulator action and by insuring limitation of the regulator effect by incipient grid current flow, recourse could be had also to other auxiliary ways and means to the end of imposing a limitation upon the regulation effect during the return stroke of the saw-tooth (flyback). For example, the resistance 15, Fig. 1, may have connected in parallel to itself a rectifier of such a polarity that it will be opened only in the presence of the voltage sign which during the flyback of the saw-tooth voltage wave arises across the resistance 15 and then constitutes practically a short-circuit for this voltage. In the layout shown in Figs. 2, 4, 8, the secondary winding itself could be constructed to have such a high inner resistance that the resistance 16 may be dispensed with.

What we claim is:

1. Apparatus for correcting the non-rectilinearity of a saw-tooth wave comprising a multi-grid vacuum tube having anode, cathode and at least two grid electrodes, circuit means for biasing the anode of said tube positively with respect to the cathode, resistive means connected in series in said circuit means, an electrostatic storage means connected between the anode and cathode of said tube whereby said storage means is charged through said resistance, voltage dividing resistance means connected across said electrostatic storage means, a second vacuum tube having anode, cathode and at least one control electrode, means for impressing at least a portion of the potential impressed on said voltage dividing means between the cathode and control electrode of said second tube, means for feeding back a portion of the energy in the anode–cathode circuit of said second tube and impressing it onto a control grid-cathode circuit of said first vacuum tube, and means for impressing a saw-tooth wave which may be non-rectilinear between the cathode and another control electrode of said first vacuum tube.

2. Apparatus for correcting the non-rectilinearity of a saw-tooth wave comprising a multi-grid vacuum tube having anode, cathode and at least two grid electrodes, circuit means for biasing the anode of said tube positively with respect to the cathode, resistive means connected in series in said circuit means, an electrostatic storage means connected between the anode and cathode of said tube whereby said storage means is charged through said resistance, voltage dividing resistance means connected across said electrostatic storage means, a second vacuum tube having anode, cathode and at least one control electrode, means for impressing at least a portion of the potential impressed on said voltage dividing means between the cathode and control electrode of said second tube, an inductive member connected between the anode and cathode of said second tube, a second inductive member coupled to the first inductive member, means for connecting the second inductive member between a grid and the cathode of said first tube, and means for impressing a saw-tooth wave which may be non-rectilinear between the cathode and another control electrode of said first vacuum tube.

MAX GEIGER.
RUDOLF URTEL.